United States Patent
Isaac

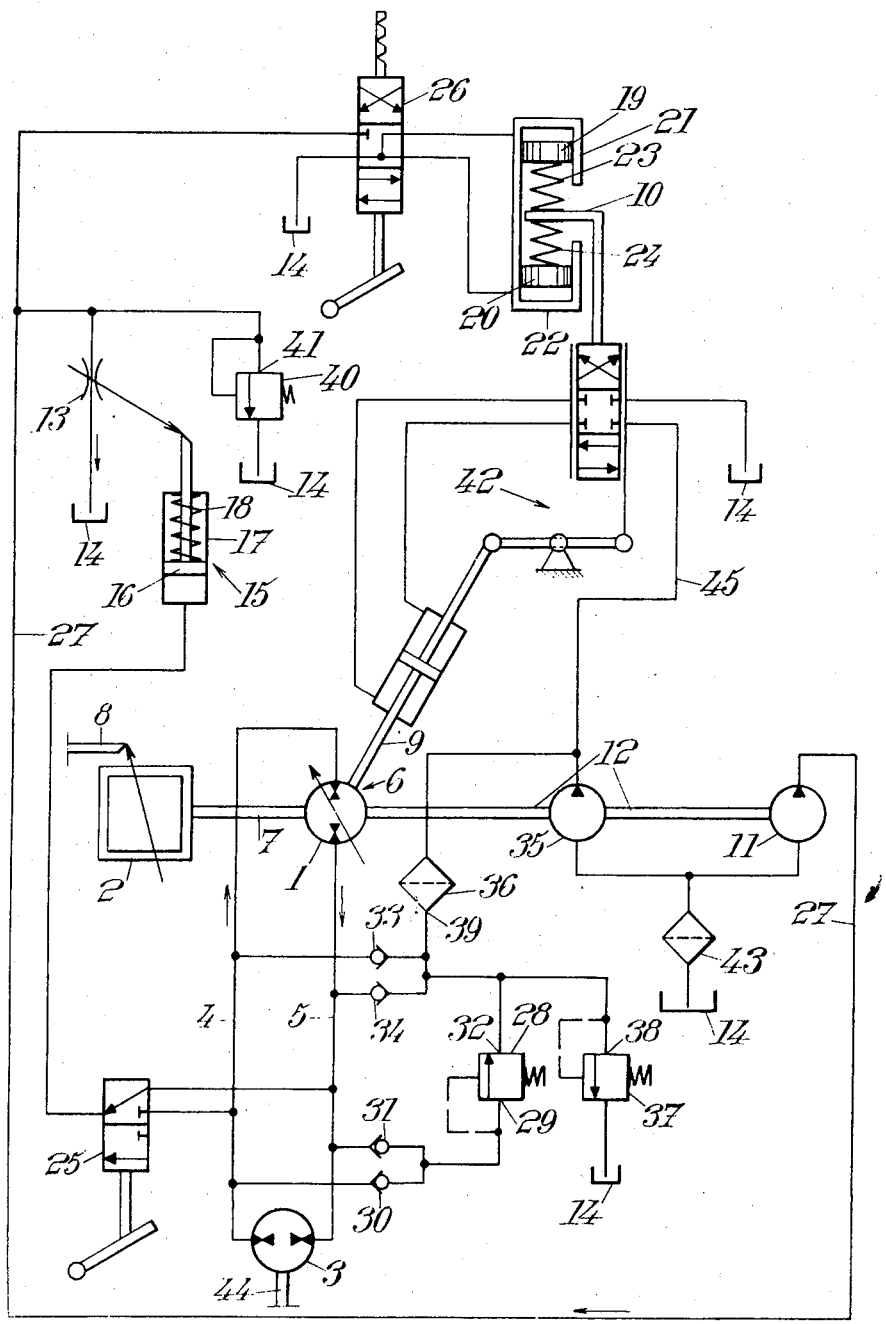

[15] 3,650,108
[45] Mar. 21, 1972

[54] HYDROSTATIC TRANSMISSION CONTROL

[72] Inventor: Olivier Isaac, Lyon, France

[73] Assignee: Societe Industrielle Generale de Mecanique Appliquee S.I.G.M.A., Paris, France

[22] Filed: Sept. 17, 1969

[21] Appl. No.: 858,579

[30] Foreign Application Priority Data

Sept. 20, 1968 France .................................... 167081

[52] U.S. Cl. .................................. 60/53 R, 60/52 VS, 60/19
[51] Int. Cl. ...................................................... F16d 31/00
[58] Field of Search ...................... 60/53 R, 19, 52 VS, 53 A

[56] References Cited

UNITED STATES PATENTS

| | | | |
|---|---|---|---|
| 2,238,061 | 4/1941 | Kendrick | 60/53 UX |
| 3,054,263 | 9/1962 | Budzich et al. | 60/53 |
| 3,214,911 | 11/1965 | Kempson | 60/53 |
| 3,402,549 | 9/1968 | Connett et al. | 60/19 |

Primary Examiner—Edgar W. Geoghegan
Attorney—Gerard J. Weiser

[57] ABSTRACT

A hydrostatic transmission of the kind useful in an automotive vehicle is controlled automatically by adjustment of the output of a driven hydraulic generator (i.e., a pump) to maintain the torque absorbed by the generator substantially equal to the vehicle driving motor torque. Such adjustment is effected in accordance with fluid pressure established in accordance with the generator speed but modified in accordance with fluid pressure established between the generator and a receptor (i.e., a hydraulic motor) connected hydraulically thereto and connectable mechanically to one or more traction wheels of the vehicle.

2 Claims, 1 Drawing Figure

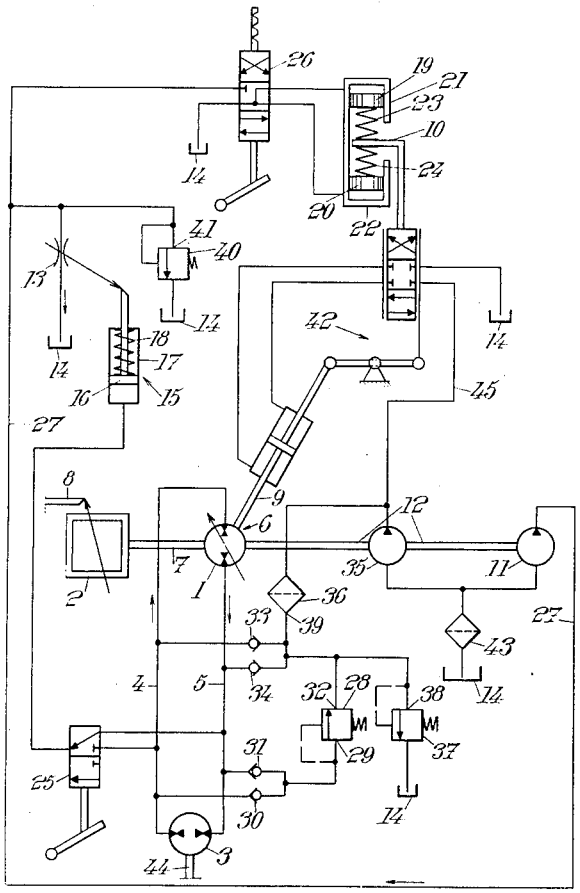

HYDROSTATIC TRANSMISSION CONTROL

This invention relates to control, especially self-regulation, of hydraulic transmissions. It concerns hydrostatic transmissions of the kind comprising an hydraulic generator or pump driven by a drive motor such as a heat engine or electric motor, at least one receptor or hydraulic motor interconnected mechanically to a propulsion device liable to be subjected to variable external forces, two conduits arranged in a closed main circuit between the generator and the receptor, and a mechanism adapted to vary the output of the generator, i.e., the delivery per shaft revolution thereof. It concerns more particularly, but not exclusively, as likely to be the most interesting application thereof, those that are installed in automotive vehicles, the propulsion device then being a traction wheel (or a group of traction wheels) of a vehicle.

It is known that in this class of hydrostatic transmissions the relationship between the respective speeds of the prime mover or motor shaft and the hydraulic motor or receptor shaft is fixed by the value of the generator output when the receptor has a constant output, or delivery per shaft revolution.

For the given external forces acting upon the propulsion means, it is suitable that the relationship be chosen in such a way that the torque required from the motor, when the latter rotates at a given speed, is substantially equal to the effective torque that the motor can furnish at that speed, in accordance with its characteristic torque-number of revolutions per unit time, the torque required from the motor being equal to the torque absorbed by the generator.

As the external forces change, it is necessary to effect continual adjustment of this relationship in order to maintain the equality between the torque required from the motor and the torque it can furnish; an inequality causes underspeeding or overspeeding of the motor. Such continual adjustment in relationship thereof is a burdensome task for the driver of the automotive vehicle.

A primary object of the present invention is to remedy this inconvenience while rendering the adjustment of that relationship automatic.

Other objects of this invention, together with means and methods for attaining the various objects will be apparent from what follows hereinafter.

The invention consists principally, in hydrostatic transmissions of the kind concerned in providing—at the same time as the aforesaid mechanism is controlled by means subject to the pressure of a fluid—an auxiliary circuit adapted to furnish that fluid under a pressure varying in the same sense as the generator speed and in a sense opposite to the value of the external forces, the overall effect being such that, whatever the value of the external forces, the torque absorbed by the generator is substantially equal to the torque that the motor driving it can furnish.

The invention consists, aside from this principal arrangement, in certain other arrangements that are utilized preferably at the same time and which will be discussed more specifically hereinafter.

This invention will be understandable, in any case, with the aid of the following description as well as the accompanying diagram, relating to a preferred arrangement given purely by way of example.

The single view of this diagram shows schematically a preferred embodiment of a hydrostatic transmission constructed according to the invention.

This hydrostatic transmission comprises, as a whole, an hydraulic generator (or pump) 1 driven by a motor 2, a receptor (or hydraulic motor) 3 interconnected mechanically by its shaft 44 to a propulsion device (made up of a traction wheel, not shown) liable to be subjected to variable external forces, two conduits 4 and 5 arranged in a closed circuit between generator 1 and receptor 3, and a mechanism adapted to effect variation in the generator output, i.e., the delivery per revolution of drive shaft 7 thereof.

Drive motor 2 can be a Diesel engine or an internal combustion engine having a control such as a pedal that the driver can depress to determine, according to the type of feed associated with motor 2, the torque furnished by that motor or the speed of drive shaft 7.

Numerous designs for the aforesaid mechanism are known; the generator can be, for example, a pump with axial pistons whose strokes have their amplitudes controlled by the angular position of a cam forming an essential part of that mechanism, the position thereof being determined, for example, by that of a movable rod.

That being so, according to the invention, at the same time as the aforesaid mechanism is controlled by means (hereinafter called "first means") responsive to the pressure of a fluid, an auxiliary circuit is provided that is adapted to furnish such fluid under a pressure varying in the same sense as the speed of generator 1 and in a sense opposite to the value of the aforementioned external forces, the torque absorbed by generator 1 being substantially equal to the torque that the motor can furnish.

The aforesaid auxiliary circuit is advantageously made up of a pump 11 interconnected mechanically to generator 1 by a shaft 12; this pump takes in fluid and discharges it into conduit 27 provided with a choke 13 having an adjustable opening to a discharge space. Progressive opening of choke 13 is controlled by means 15 (hereinafter called "second means") such as a hydraulic jack responsive to the pressure prevailing in that one of channels 4 and 5 which joins the intake of the receptor 3 to the outlet of generator 1, the fluid under pressure in conduit 27 being withdrawn ahead of choke 13 and adapted to actuate the aforesaid first means. In the usual case, where the fluid is a liquid, the aforementioned discharge space comprises a reservoir or flume 14 from which pump 11 can be refilled. For clarity of the drawing this reservoir has been represented at several places therein.

The variable opening of choke 13 can be obtained, for example, by the displacement of a pointer (not shown) juxtaposed thereto.

The aforesaid second means is advantageously made up of a piston 16 slidably fitting in a cylinder 17, such piston being subjected, in a sense corresponding to an increase in the opening of choke 13, to the pressure prevailing in conduit 4 or 5 and, in the opposite sense, to the action of a retracting device 18 (composed of a spring, for example).

According to a first embodiment, it is assumed first of all that the generator is of an irreversible kind, whereupon the direction of circulation of fluid between generator 1 and receptor 3 is unchanging (direction indicated by arrows on the diagram). Conduit 5 then joins the intake of receptor 3 permanently to the outlet of generator 1. The direction of fluid flow in conduit 27 is similarly indicated by an arrow.

According to this first embodiment, the aforesaid first means is made up of a piston 19 slidably fitting in a cylinder 21, which is connected to conduit 27 ahead of choke 13, that piston being subject to an elastic retracting device, as in the form of spring 23, for example.

In order to inactivate the aforesaid first means it is beneficial to interpose between conduit 27 and cylinder 21 a distributor 26, adapted in a first position to isolate cylinder 21 from that conduit by connection to reservoir 14, and adapted in a second position to connect that cylinder to conduit 27.

To protect the closed circuit made up of conduits 4 and 5 from excessive pressures that can occur therein, a pressure limiter 28 is provided whose inlet 29 is connected to conduits 4 and 5 by way of respective check valves 30 and 31 and whose outlets can be connected to conduits 4 and 5, respectively, by check valves 33 and 34. Thus, too great a pressure in one of conduits 4 and 5 effects an outflow of liquid through the opening of limiter 28 and corresponding valve 30 or 31, and eventually a reintroduction of liquid into the other of these conduits by opening of valve 34 or 33.

So that conduits 4 and 5 may be filled with fluid, whenever fluid circulating in the closed circuit formed thereby has been drawn off or has leaked out, a pump 35 is provided interconnected mechanically to generator 1 or to motor 2 and discharging thereinto through a filter 36, and valves 33 and 34. Pump 35 is protected against excessive pressure by pressure limiter 37 whose intake 38 is connected to outlet 39 of filter 36. Outlet 32 of pressure limiter 28 can also be connected to this inlet 38. Pump 35 is able to withdraw liquid from reservoir 14 by way of a filter 43, which also can serve pump 11.

Pump 11 is protected against excessive pressure by a pressure limiter 40 whose inlet 41 is connected ahead of choke 13 to conduit 27 of the aforesaid auxiliary circuit.

Movement of piston 19 is preferably communicated to rod 9 by way of a rod 10 and an hydraulic amplifier or jack 42 filled by pump 35 through conduit 45.

According to a second embodiment, it is assumed that generator 1 is reversible, the direction of circulation of fluid between generator 1 and receptor 3 being either that indicated by the arrows (vehicle moving forward) or in the opposite direction (moving backward).

In such case, mechanism 6 is arranged so that it effects an increase in the generator output from an initial null value corresponding to the intermediate position of piston rod 9 depicted in the diagram. Displacement of this rod 9 from its initial intermediate position in one direction or the other produces an increase in generator output into conduit 4 or into conduit 5.

Moreover, the first aforesaid means is made up of a pair of pistons 19 and 20 slidably fitting in a respective pair of aligned cylinders 21 and 22, rod 10 having one end (depicted bent at a right angles to the body of the rod) located between the two pistons, to which it is connected by elastic return devices comprising springs 23 and 24. Thus, rod 10 can be displaced in one direction or the other from an initial intermediate position (depicted in the diagram) according as the pressure prevailing in conduit 27 ahead of choke 13 also prevails in cylinder 21 or 22, i.e., as the generator discharges into conduit 5 (forward movement) or conduit 4 (backward movement). At the same time, cylinder 17 is connected to the one of conduits 4 and 5 into which generator 1 discharges.

To permit convenient connection of cylinder 21 or cylinder 22 with conduit 27, distributor 26 is designed so that it can occupy not only two positions, as in the previous embodiment, but three positions. Such positions are an intermediate neutral position (depicted) in which both cylinders 21 and 22 are connected to reservoir 14, while being isolated from conduit 27, and two active positions in which one of the two cylinders is connected to conduit 27 ahead of choke 13 and the other is emptied into reservoir 14.

Finally, for convenient linking of cylinder 17 with the appropriate one of conduits 4 and 5, a distributor 25 is provided that can be interconnected mechanically to distributor 26.

In view of the foregoing, whichever embodiment may be adopted, a hydrostatic transmission is obtained with variable output that functions as follows, this discussion being limited to the conditions existing when distributor 26 is in one of its active positions (or in its only active position).

At first it is assumed that the vehicle is at rest, with the motor idling, and that the operator wishes to make the vehicle move forward. In the instance of the second aforementioned embodiment, the operator puts distributor 25 into the position (depicted) wherein cylinder 17 is connected to conduit 5 and also puts (by raising it) distributor 26 (depicted in neutral) into the position wherein cylinder 21 is connected to conduit 27 of the auxiliary circuit ahead of choke 13 and cylinder 22 is discharging.

When the motor is idling, the pressure induced by pump 11 ahead of choke 13 is insufficient to cause displacement of piston 19, and generator 1 has negligible output.

As soon as the driver accelerates motor 2, by depressing pedal 8, the output of pump 11 (driven at a speed equal or proportional to that of generator 1) increases, and the fluid pressure in conduit 27 increases, thereby displacing piston 19 and rod 10 in the direction (viz, downward) corresponding to an increase in the generator output. This output thus has a value increased all the more as the speed of rotation of motor 2 is increased.

When the external forces that act upon the wheel driven by receptor 3 increase, the pressure of fluid flowing in conduit 5 increases, thereby displacing piston 16 in a direction (viz, upward) that effects an enlargement of the choke opening. Such enlargement brings about a reduction of fluid pressure in conduit 27 (ahead of the choke) and, consequently, a displacement of piston 19 and of rod 10 in a direction (upward) corresponding to reduction of the output of generator 1.

When pedal 8 is completely depressed, motor 2 rotates at maximum speed and can furnish a given torque.

Variations in the external forces acting upon the wheel driven by receptor 3 then bring about automatically variations in the position of piston 19 and of rod 10, so that the torque absorbed by generator 1 is substantially equal to the aforesaid given torque that the motor 2 can furnish.

When the external forces are such that motor 2 brakes the vehicle (going down slope) the pressures reverse in conduits 4 and 5, in which event piston 16 is no longer subjected to fluid pressure because conduit 5 lacks appreciable pressure. Under these conditions, fluid discharged by pump 11 into choke 13 determines a pressure ahead of the choke such that the generator output has at each instant the appropriate value so that the torque absorbed by generator 1 is substantially equal to the torque that the motor can furnish.

In the case of the aforementioned second embodiment, if the vehicle is put into reverse, distributors 25 and 26 are put into the opposite positions to those described hereinabove (i.e., with cylinder 17 communicating with conduit 4, instead of conduit 5; and with conduit 27 communicating with cylinder 22, instead of cylinder 21, which is discharging instead), whereupon the functioning is analogous to that described hereinabove.

It goes without saying, and follows moreover from the foregoing, that the invention, having been specifically described and illustrated, is not at all limited to those ways of practicing it, any more than to those ways of embodying it from various parts. Modifications may be made therein while retaining the benefits, and without departing from the concept of, this invention, which itself is defined in the following claims.

I claim:

1. In a hydrostatic transmission, a device for controlling the stroke volume of a variable stroke hydraulic pump, supplying a hydraulic motor through a closed circuit, said device comprising:

an auxiliary constant stroke pump to replenish the closed circuit with liquid,
an adjustable choke member, mounted in a hydraulic circuit traversed by a flow of liquid dependent on the rotary speed of the variable stroke pump, adapted to create a loss of load,
a first hydraulic jack sensitive to said load loss, adapted to control the stroke volume of the variable stroke pump,
a second hydraulic jack sensitive to the delivery pressure of the variable stroke pump, adapted to control the opening of said choke member so that, when the delivery pressure of the variable stroke pump increases, a reduction in the stroke volume of the latter is effected,
and a tachometric constant stroke pump, distinct from said auxiliary pump, driven at a speed proportional to that of the constant stroke pump, said tachometric pump feeding in parallel, the adjustable choke member and the first hydraulic jack, said choke member being connected, downstream, to a reservoir of liquid at relatively nil pressure.

2. Device according to claim 1 comprising a slide valve having an output connected by a supply channel to the second hydraulic jack, said slide valve having means selective as to direction of operation and having two inputs, each of said input being connected to a respective side of said closed hydraulic circuit, the means selective of the direction of operation of said slide valve being adapted to occupy the position for which the supply channel of said second hydraulic jack is connected to that side of the closed circuit where the delivery pressure of the variable stroke pump is exerted.